US009957634B2

(12) United States Patent
Hiraoka et al.

(10) Patent No.: US 9,957,634 B2
(45) Date of Patent: May 1, 2018

(54) FILM FORMATION DEVICE AND FILM FORMATION METHOD FOR FORMING METAL FILM

(71) Applicants: Motoki Hiraoka, Toyota (JP); Hiroshi Yanagimoto, Miyoshi (JP); Yuki Sato, Nagakute (JP); Takayasu Yoshioka, Toyota (JP)

(72) Inventors: Motoki Hiraoka, Toyota (JP); Hiroshi Yanagimoto, Miyoshi (JP); Yuki Sato, Nagakute (JP); Takayasu Yoshioka, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 486 days.

(21) Appl. No.: 14/371,036

(22) PCT Filed: Feb. 21, 2013

(86) PCT No.: PCT/JP2013/054355
§ 371 (c)(1),
(2) Date: Jul. 8, 2014

(87) PCT Pub. No.: WO2013/125643
PCT Pub. Date: Aug. 29, 2013

(65) Prior Publication Data
US 2015/0014178 A1  Jan. 15, 2015

(30) Foreign Application Priority Data
Feb. 23, 2012 (JP) .................................. 2012-037498

(51) Int. Cl.
*C25B 9/00* (2006.01)
*C25D 17/00* (2006.01)
(Continued)

(52) U.S. Cl.
CPC ............... *C25D 17/00* (2013.01); *C25D 3/00* (2013.01); *C25D 5/02* (2013.01); *C25D 5/022* (2013.01);
(Continued)

(58) Field of Classification Search
CPC ........ C25B 9/00; C25D 17/002; C25D 17/00; C25D 3/00
(Continued)

(56) References Cited

U.S. PATENT DOCUMENTS 4,326,930 A * 4/1982 Nagel ....................... C25B 9/10
  205/161
6,375,823 B1 * 4/2002 Matsuda .................. C25D 5/02
  205/117
(Continued)

FOREIGN PATENT DOCUMENTS

JP  55-138892   10/1980
JP  H01-165786   6/1989
(Continued)

OTHER PUBLICATIONS

Akamatsu, K. et al., "Fabrication of Silver Patterns on Polyimide Films Based on Solid-Phase Electrochemical Constructive Lithography Using Ion-Exchangeable Precursor Layers," Langmuir, vol. 27, pp. 11761-11766, (2011).
(Continued)

*Primary Examiner* — Zulmariam Mendez
(74) *Attorney, Agent, or Firm* — Finnegan, Henderson, Farabow, Garrett & Dunner, LLP (57) ABSTRACT

Provided are a film formation device and a film formation method for forming a metal film, with which metal films with a desired thickness can be continuously formed on surfaces of a plurality of substrates. A film formation device 1A includes at least a positive electrode 11, a negative
(Continued)

electrode 12, a solid electrolyte membrane 13 arranged on a surface of the positive electrode 12, between. the positive electrode and a substrate to serve as the negative electrode, and a power supply unit E adapted to apply a voltage across the positive electrode 11 and the substrate B. A voltage is applied across the positive electrode 11 and the substrate B to deposit metal on a surface of the substrate from metal ions contained in the solid electrolyte membrane 13, whereby a metal film F made of metal is formed, The positive electrode 11 is made of a porous body that allows a solution L containing metal ions to pass therethrough and supplies the metal ions to the solid electrolyte membrane 13.

9 Claims, 7 Drawing Sheets (51) Int. Cl.
    *C25D 3/00*   (2006.01)
    *C25D 17/12*  (2006.01)
    *C25D 5/08*   (2006.01)
    *C25D 21/14*  (2006.01)
    *C25D 5/02*   (2006.01)
    *C25D 5/34*   (2006.01)
    *C25D 17/14*  (2006.01)
    *C25D 3/38*   (2006.01)

(52) U.S. Cl.
    CPC .............. *C25D 5/08* (2013.01); *C25D 5/34* (2013.01); *C25D 17/005* (2013.01); *C25D 17/12* (2013.01); *C25D 17/14* (2013.01); *C25D 21/14* (2013.01); *C25D 3/38* (2013.01)

(58) Field of Classification Search
    USPC .......................................... 204/263; 205/261
    See application file for complete search history.

(56) References Cited

U.S. PATENT DOCUMENTS

| | | | |
|---|---|---|---|
| 7,943,019 B2* | 5/2011 | Otogawa | C25B 11/041 204/290.12 |
| 2002/0134674 A1* | 9/2002 | Andrews | A61L 2/183 204/242 |
| 2008/0217182 A1 | 9/2008 | Dai | |
| 2009/0050487 A1 | 2/2009 | Fang et al. | |
| 2010/0230278 A1* | 9/2010 | Taruya | C25B 15/08 204/263 |
| 2011/0147202 A1* | 6/2011 | Haryu | C25B 1/04 204/257 |
| 2011/0180398 A1* | 7/2011 | Nakazawa | C25B 1/12 204/258 |
| 2011/0180416 A1* | 7/2011 | Kurashina | C25B 1/12 205/335 |

FOREIGN PATENT DOCUMENTS

| | | |
|---|---|---|
| JP | 5-70986 | 3/1993 |
| JP | 5-148661 | 6/1993 |
| JP | 2010-37622 | 2/2010 |
| JP | 2012-219362 | 11/2012 |

OTHER PUBLICATIONS

Schmidt, J.A., et al., Copper Electrodeposition on Glassy Carbon From a Solid Electrolyte, Electrochimica Acta, 1993, pp. 577-580, vol. 38, No. 4, Elsevier Science Publishers, Barking, Great Britain.

U.S. Appl. No. 15/064,226, filed Mar. 8, 2016.

Office Action issued in U.S. Appl. No. 15/064,226 dated Jun. 26, 2017.

Final Office Action issued in U.S. Appl. No. 15/064,226 dated Nov. 8, 2017.

* cited by examiner

FILM FORMATION DEVICE AND FILM FORMATION METHOD FOR FORMING METAL FILM

CROSS-REFERENCE TO RELATED APPLICATIONS

This application is a national phase application of International Application No. PCT/JP2013/054355, filed Feb. 21, 2013, and claims the priority of Japanese Application No. 2012-037498, filed Feb 23, 2012, the content of both of which is incorporated herein by reference.

TECHNICAL FIELD

The present invention relates to a film formation device and a film formation method for forming a metal film. In particular, the present invention relates to a film formation device and a film formation method for forming a metal film, with which a thin metal film can be uniformly formed on the surface of a substrate.

BACKGROUND ART

Conventionally, when an electronic circuit board or the like is produced, it has been common to form a metal film on the surface of a substrate to form a metallic circuit pattern thereon. For example, as a film formation technology for forming such a metal film, there has been proposed a film formation technology that includes forming a metal film on the surface of a Si semiconductor substrate or the like through a plating process such as an electroless plating process (for example, see Patent Literature 1), or forming a metal film using PVD such as sputtering.

However, when a plating process such as an electroless plating process is performed, it has been necessary to perform washing after the plating process, as well as a process of processing a waste liquid that has been produced during washing. Meanwhile, when a film is formed on the surface of a substrate using PVD such as sputtering, internal stress is generated in the metal film formed. Thus, there is a limitation in increasing the thickness of the film. In particular, when sputtering is performed, it has been possible to form a film only in a high vacuum in some cases.

In view of the foregoing, there has been proposed a film formation method for forming a metal film that uses a positive electrode, a negative electrode, a solid electrolyte membrane disposed between the positive electrode and the negative electrode, and a power supply unit that applies a voltage across the positive electrode and the negative electrode (for example, see Non Patent Literature 1).

The solid electrolyte membrane herein is formed by spin-coating the surface of a substrate with a solution containing a precursor of the solid electrolyte membrane in advance and curing the solution and then impregnating the resulting membrane with metal ions to cover the surface of the substrate. Then, the substrate is disposed such that it is opposite the positive electrode and is electrically connected to the negative electrode, and a voltage is applied across the positive electrode and the negative electrode, so that the metal ions that have impregnated the solid electrolyte membrane are deposited on the negative electrode side. Accordingly, a metal film made of metal of the metal ions can be formed.

CITATION LIST

Patent Literature

Patent Literature 1: JP 2010-037622 A

Non Patent Literature

Non Patent Literature 1: Fabrication of Silver Patterns on Polyimide Films Based on Solid-Phase Electrochemical Constructive Lithography Using Ion-Exchangeable Precursor Layers Langmuir, 2011, 27 (19), pp 11761-11766

SUMMARY OF INVENTION

Technical Problem

However, when the technology described in Non Patent Literature 1 is used, a solution containing a precursor of a solid electrolyte membrane is applied to the surface of a substrate, and the solution is cured, and further, the resulting membrane is impregnated with metal ions. Thus, it has been necessary to, each time a film is formed, produce a solid electrolyte membrane and impregnate it with metal ions to cover the surface of a substrate, and thus, it has been impossible to continuously form metal films on the surfaces of a plurality of substrates.

Further, since there is a limitation in the type of metal to impregnate the solid electrolyte membrane, there is also a limitation in the amount of metal that can be deposited. Accordingly, there have been cases where a metal film with a desired thickness cannot be obtained.

The present invention has been made in view of the foregoing. It is an object of the present invention to provide a film formation device and a film formation method for forming a metal film, with which metal films with a desired thickness can be continuously formed on the surfaces of a plurality of substrates.

Solution to Problem

In view of the foregoing, a film formation device for forming a metal film in accordance with the present invention includes at least a positive electrode; a solid electrolyte membrane formed on the surface of the positive electrode, the solid electrolyte membrane being disposed between the positive electrode and a substrate to serve as a negative electrode; and a power supply unit adapted to apply a voltage across the positive electrode and the substrate. A voltage is applied across the positive electrode and the substrate to deposit metal on the surface of the substrate from metal ions contained in the solid electrolyte membrane, so that a metal film made of the metal is formed. The positive electrode is made of a porous body that allows a solution containing the metal ions to pass therethrough and supplies the metal ions to the solid electrolyte membrane.

According to the present invention, during formation of a film, the solid electrolyte membrane is made into contact with the substrate in a state in which the solid electrolyte membrane is disposed on the positive electrode. In such a state, a voltage is applied across the positive electrode and the substrate to serve as the negative electrode by the power supply unit, whereby metal can be deposited on the surface of the substrate from metal ions contained in the solid electrolyte membrane. Consequently, a metal film made of metal of the metal ions can be formed on the surface of the substrate.

Herein, the positive electrode is a porous body, and the positive electrode made of such a porous body can allow a solution containing metal ions to pass therethrough, and thus can supply (metal ions of) the solution to the solid electrolyte membrane. Accordingly, during formation of a film, the solution containing metal ions can be supplied via the positive electrode that is a porous body. The supplied solution containing metal ions passes through the positive electrode, and contacts the solid electrolyte membrane that is adjacent to the positive electrode, so that the solid electrolyte membrane is impregnated with the metal ions.

Consequently, the metal ions contained in the solid electrolyte membrane are supplied from the positive electrode side and are deposited during formation of a film. Accordingly, metal films with a desired thickness can be continuously formed on surfaces of a plurality of substrates without restrictions on the amounts of metal that can be deposited.

As a more preferable configuration, the film formation device includes a metal ion supply unit for supplying the solution containing metal ions to the positive electrode. According to such a configuration, metal films can be continuously formed while the solution containing metal ions is supplied to the positive electrode from the metal ion supply unit.

As a further preferable configuration, the film formation device further includes a pressure unit adapted to move the positive electrode toward the substrate, thereby pressing the solid electrolyte membrane against the substrate on which a film is to be formed. According to such a configuration, the solid electrolyte membrane can be pressed by the pressure unit via the positive electrode. Thus, the electrolyte membrane can be made to uniformly contact the surface of the film formation region of the substrate, and thus, the surface of the film formation region of the substrate can be covered with a metal film. Accordingly, a homogeneous metal film with a uniform thickness can be formed on the surface of the substrate, As a preferable configuration, a conducting portion is further provided that is formed in a manner surrounding the film formation region of the substrate during formation of a film, the conducting portion being adapted to electrically connect a negative electrode of the power supply unit and the substrate. According to such a configuration, when a surface including the film formation region is made of metal or has a metal base layer formed thereon, it is possible to allow the conducting portion to be in contact with the surface including the film formation region, so that metal can be deposited on the film formation region around the conducting portion. Accordingly, a uniform amount of current can be made to flow through the film formation region, and thus, a metal film with a uniform thickness and a uniform shape can be formed.

Further, in such a configuration, the solid electrolyte membrane has a shape that conforms to the shape of the film formation region of the substrate, and an insulator is further disposed on the positive electrode in a manner surrounding the solid electrolyte membrane. The conducting portion preferably includes a plurality of conducting protrusions that are arranged so that they protrude toward the substrate from the surface of the insulator.

According to such a configuration, the positive electrode and the conducting portion are formed as an integrated structure, and also, an insulator is disposed at a position not corresponding to the film formation region of the substrate. Consequently, a metal film is not formed on the surface of the substrate at a position opposite the insulator, while a metal film with a desired shape can be formed on the film formation region, As a further preferable configuration, the conducting protrusions have a structure in which, when the conducting protrusions are made into contact with the substrate upon application of pressure by the pressure unit, the conducting protrusions are pressed into the insulator due to the pressure applied.

According to such a configuration, the conducting protrusions are, upon application of pressure by the pressure unit, pressed into the insulator while being in contact with the substrate. Accordingly, tip ends of the conducting protrusions, which form the conducting portion, are made to contact the surface of the substrate. Thus, the solid electrolyte membrane can be made to uniformly contact the film formation region of the substrate while the conducting protrusions and the substrate are electrically connected. Consequently, a metal film with a uniform thickness can be formed more easily.

As a further preferable configuration, the surface of the positive electrode that is in contact with the solid electrolyte membrane has a film formation surface with a shape that conforms to the shape of the film formation region of the substrate, and a non-film formation surface other than the film formation surface, and metal of the film formation surface is metal with a lower oxygen overvoltage than that of metal of the non-film formation surface.

According to such a configuration, metal of the film formation surface is metal with a lower oxygen overvoltage than that of metal of the non-film formation surface. Thus, it is possible to increase the deposition reactivity of metal on the film formation region of the substrate, which is opposite the film formation surface, from metal ions during formation of the film. Consequently, metal can be deposited only on the film formation region of the substrate that is opposite the film formation surface. As described above, a metal film can be formed with a pattern that conforms to the shape of the film formation surface without the need to mask the surface of the substrate or the like.

As a further preferable configuration, the solid electrolyte membrane contains hydrogen ions. According to such a configuration, it is possible to, in or before forming a film on a substrate that has an oxide film such as a passivation film formed on its surface, reduce the oxide of the oxide film with the hydrogen ions that have impregnated the solid electrolyte membrane by applying a voltage. Consequently, the oxide on the surface of the substrate is removed (reduced), and a metal film with higher adhesion can be formed on the reduced surface.

As the present invention, there is also disclosed a film formation method that is suitable for forming a metal film. The film formation method in accordance with the present invention is a film formation method for forming a metal film that includes disposing a solid electrolyte membrane between a positive electrode and a substrate to serve as a negative electrode, on the surface of the positive electrode; making the solid electrolyte membrane into contact with the substrate and applying a voltage across the positive electrode and the substrate to deposit metal on the surface of the substrate from metal ions contained in the solid electrolyte membrane, thereby forming a metal film made of the metal on the surface of the substrate. As the positive electrode, a porous body that allows a solution containing the metal ions to pass therethrough and supplies the metal ions to the solid electrolyte membrane is used.

According to the present invention, the solid electrolyte membrane is disposed on the surface of the positive electrode and the solid electrolyte membrane is made into contact with the substrate. In such a state, a voltage is applied across the positive electrode and the substrate to deposit metal on the surface of the substrate from metal ions contained in the solid electrolyte membrane, whereby a metal film can be formed on the surface of the substrate.

Herein, when a positive electrode made of a porous body is used, it is possible to allow a solution containing metal ions to pass through the positive electrode and thus supply the solution to the solid electrolyte membrane. Accordingly, it is possible to supply the solution containing metal ions via the positive electrode made of the porous body during formation of a film. The supplied solution containing metal ions passes through the positive electrode, and contacts the solid electrolyte membrane that is adjacent to the positive electrode, so that the solid electrolyte membrane is impregnated with metal ions.

Consequently, the metal ions contained in the solid electrolyte membrane are supplied from the positive electrode side and are deposited during formation of a film. Accordingly, metal films with a desired thickness can be continuously formed on the surfaces of a plurality of substrates.

As a further preferable configuration, the metal film is formed while the solution containing metal ions is supplied to the positive electrode. According to such a configuration, metal films can be continuously formed while a solution containing metal ions is supplied to the positive electrode.

As a further preferable configuration, the positive electrode is moved toward the substrate, whereby the solid electrolyte membrane is pressed against the film formation region of the substrate. According to such a configuration, the solid electrolyte membrane can be pressed via the positive electrode. Thus, the solid electrolyte membrane can be made to uniformly contact the surface of the film formation region of the substrate, and thus, the surface can be covered with a metal film.

As a further preferable configuration, a conducting portion adapted to electrically connect a negative electrode of a power supply unit that applies the voltage and the substrate is disposed such that the conducting portion surrounds a film formation region of the substrate during formation of the film. According to such a configuration, the conducting portion is made into contact with the surface of the substrate around the film formation region, whereby metal can be deposited on the film formation region around the conducting portion. Accordingly, a uniform amount of current can be made to flow through the film formation region, and thus, a metal film with a desired shape and a uniform thickness can be formed.

As a further preferable configuration, a film with a shape that conforms to the shape of the film formation region of the substrate is used for the solid electrolyte membrane, an insulator is disposed on the positive electrode in a manner surrounding the solid electrolyte membrane, and a plurality of conducting protrusions are used as the conducting portion, the conducting protrusions being disposed in a manner protruding toward the substrate from the surface of the insulator. According to such a configuration, an insulator is disposed at a position not corresponding to the film formation region of the substrate. Thus, a metal film is not formed on the surface of the substrate at a position opposite the insulator, and a metal film can be formed on the film formation region with a desired shape.

As a further preferable configuration, the conducting protrusions are adapted to be, when the conducting protrusions are made into contact with the substrate upon application of pressure, pressed into the insulator by the pressure applied. According to such a configuration, the conducting protrusions are, upon application of pressure, pressed into the insulator while being in contact with the substrate. Accordingly, tip ends of the conducting protrusions, which form the negative electrode, are made to contact the surface of the substrate. Thus, the solid electrolyte membrane can be made to uniformly contact the film formation region of the substrate while the conducting protrusions and the substrate are electrically connected. Consequently, a metal film with a uniform thickness can be easily formed.

As a further preferable configuration, the surface of the positive electrode that is in contact with the solid electrolyte membrane has a film formation surface with a shape that conforms to the shape of the film formation region of the substrate, and a non-film formation surface other than the film formation surface, and metal of the film formation surface is metal with a lower oxygen overvoltage than that of metal of the non-film formation surface.

According to such a configuration, metal of the film formation surface is metal with a lower oxygen overvoltage than that of metal of the non-film formation surface. Thus, it is possible to increase the deposition reactivity of metal from metal ions, between the film formation surface of the positive electrode and the substrate. Consequently, metal can be deposited only on the film formation region of the substrate that is opposite the film formation surface. As described above, a metal film can be formed with a pattern that conforms to the shape of the film formation surface without the need to mask the surface of the substrate or the like.

As a further preferable configuration, a substrate, which has an oxide film formed on the surface thereof, is used as the substrate, and the solid electrolyte membrane is impregnated with hydrogen ions. A voltage is applied across the positive electrode and the substrate to serve as the negative electrode, so that an oxide of the oxide film is reduced by the hydrogen ions.

According to such a configuration, it is possible to, in or before forming a film on the substrate, reduce the oxide of the oxide film with the hydrogen ions that have impregnated the solid electrolyte membrane by applying a voltage. Consequently, the oxide on the surface of the substrate is removed (reduced), and a metal film that is formed on the reduced surface can have higher adhesion as compared to a metal film that is formed on a surface having an oxide formed thereon.

Advantageous Effects of Invention

According to the present invention, metal films with a desired thickness can be continuously formed on the surfaces of a plurality of substrates.

BRIEF DESCRIPTION OF DRAWINGS

FIG. 2(a) is a schematic cross-sectional view illustrating the state of the film formation device before formation of a film, and FIG. 2(b) is a schematic cross-sectional view illustrating the state of the film formation device during formation of a film.

FIG. 7(a) is a schematic cross-sectional view illustrating the state of the film formation device before formation of a film, and FIG. 7(b) is a schematic cross-sectional view illustrating the state of the film formation device during formation of a film.

DESCRIPTION OF EMBODIMENTS

Hereinafter, a film formation device that can favorably implement a film formation method for forming a metal film in accordance with each of the fourth embodiments of the present invention will be described.

[First Embodiment]

Figure 1:
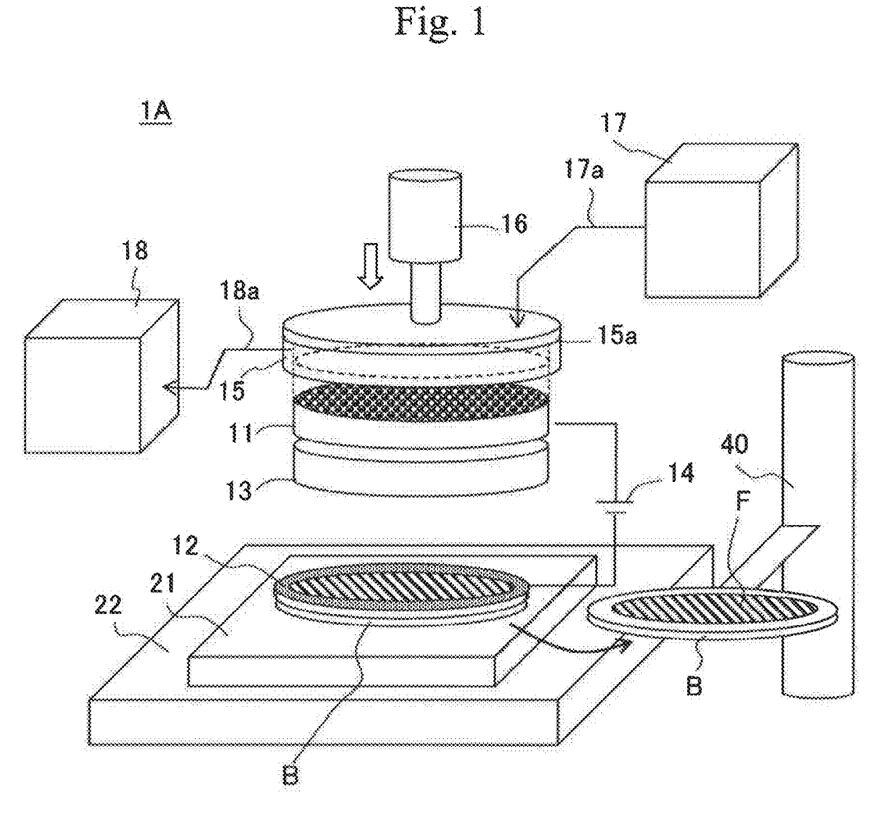
FIG. 1 is a schematic conceptual view of a film formation device for forming a metal film in accordance with a first embodiment of the present invention.
Figure 2:
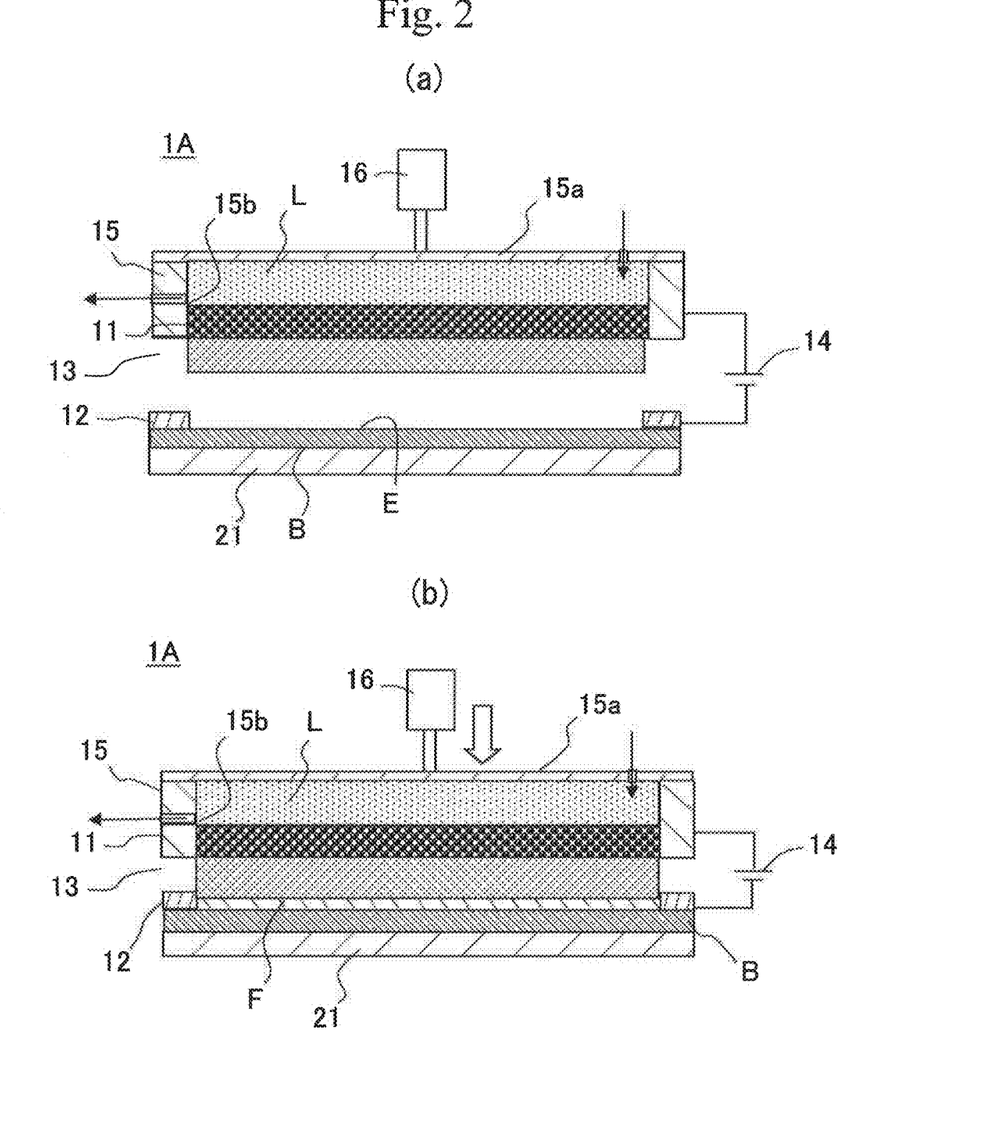
FIG. 2 are vies illustrating a film formation method that uses the film formation device forming for a metal film shown in FIG. 1; specifically.

FIG. 1 is a schematic conceptual view of a film formation device for forming a metal film in accordance with a first embodiment of the present invention. FIGS. 2 are views illustrating a film formation method that uses the film formation device for forming a metal film shown in FIG. 1; specifically, FIG. 2(a) is a schematic cross-sectional view illustrating the state of the film formation device before formation of a film, and FIG. 2(b) is a schematic cross-sectional view illustrating the state of the film formation device during formation of a film.

As illustrated in FIG. 1, a film formation device 1A in accordance with the present invention is a device that deposits metal from metal ions and thus forms a metal film made of the deposited metal on the surface of a substrate B. Herein, for the substrate B, a substrate made of a metal material such as aluminum, or a substrate obtained by forming a metal baser layer on a surface, which is to be processed, of a resin or silicon substrate is used.

The film formation device 1A includes at least a positive electrode 11 made of metal, a conducting portion 12 made of metal, a solid electrolyte membrane 13 disposed on the surface of the positive electrode 11, and a power supply unit 14 that applies a voltage across the positive electrode 11 and the substrate B to serve as a negative electrode (across the positive electrode 11 and the conducting portion 12).

Further, a metal ion supply unit 15, which supplies a solution containing metal ions (hereinafter referred to as a metal ion solution) L to the positive electrode 11, is disposed above the positive electrode 11. An opening is formed in the bottom portion of the metal ion supply unit 15, and the positive electrode 11 is allowed to be accommodated in an inner space S thereof in a state in which the positive electrode 11 fits an inner wall 15a.

A solution tank 17 having the metal ion solution L stored therein is connected to one side of the metal ion supply unit 15 via a supply pipe 17a, while a waste liquid tank 18 for collecting a waste liquid after use is connected to the other side thereof via a waste liquid pipe 18a.

With such a configuration, it is possible to supply the metal ion solution L stored in the solution tank 17 to the inside of the metal ion supply unit 15 via the supply pipe 17a, and send a waste liquid after use to the waste liquid tank 18 via the waste liquid pipe 18a.

Since the positive electrode 11 is stored in the inner space of the metal ion supply unit 15 in a state in which the positive electrode 11 fits the inner wall 15a, the metal ion solution L supplied from above the inner space can be supplied to the positive electrode 11. Herein, the positive electrode 11 is made of a porous body that allows the metal ion solution L to pass therethrough and thus supplies metal ions to the solid electrolyte membrane. Such a porous body is not particularly limited as long as (1) it is corrosive-resistant against the metal ion solution L, (2) it has conductivity that allows the porous body to function as a positive electrode, (3) it allows the metal ion solution L to pass therethrough, and (4) it can be pressed by a pressure unit 16 described below. For example, a foam metal body that is made of an open-cell foamed body with open pores and with higher ionization tendency (or a higher electrode potential) than plated metal ions, such as foamed titanium, can be used.

When a foam metal body is used, it is preferable that the porosity be about 50 to 95 vol %, the pore size be about 50 to 600 μm, and the thickness be about 0.1 to 50 mm, though the porous body is not particularly limited as long as the aforementioned condition (3) is satisfied.

Meanwhile, the conducting portion 12 is formed such that it surrounds a film-formation region E of the substrate B on which a metal film F is to be formed during formation of a film, and electrically connects a negative electrode of the power supply unit and the substrate. That is, in this embodiment, since the film-formation region E of the substrate B is circular in shape, the conducting portion 12 is in the shape of a ring such that it surrounds the film-formation region E of the substrate B.

Further, the pressure unit 16 is connected to a lid portion 15a of the metal ion supply unit 15. The pressure unit 16 is adapted to press the solid electrolyte membrane 13 against the film-formation region B of the substrate B by moving the positive electrode 11 toward the substrate B. For the pressure unit 16, a hydraulic or pneumatic cylinder or the like can be used, for example.

The film formation device 1A includes a base 21 for fixing the substrate B and adjusting the alignment of the substrate B with respect to the positive electrode 11 and the conducting portion 12, and a temperature control unit 22 that controls the temperature of the substrate B via the base 21. In this embodiment, a conveying device 40 that conveys the substrate B disposed on the base 21 is provided.

Examples of the metal ion solution L include aqueous solutions containing copper, nickel, or silver ions. Examples of aqueous solutions containing copper ions include aqueous solutions containing copper sulfate or copper pyrophosphate. In addition, examples of the solid electrolyte membrane 13 include a membrane or a film made of a solid electrolyte.

The solid electrolyte membrane 13 can be impregnated with metal ions by being made into contact with the aforementioned metal ion solution L. The solid electrolyte membrane 13 is not particularly limited as long as it allows the metal ion-derived metal to be deposited on the side of the conducting portion (i.e., on the surface of the substrate B) upon application of a voltage. Examples of the material of the solid electrolyte membrane include films with an ion-exchange function, such as fluorine resin like Nafion (registered trademark) of DuPont, hydrocarbon resin, a polyamic acid film, and Selemion (i.e., CMV, CMD, or CMF) of Asahi Glass Co., Ltd.

Hereinafter, a film formation method in accordance with this embodiment will be described. First, the substrate B is disposed on the base 21, and alignment of the substrate B with respect to the positive electrode 11 and the conducting portion 12 is adjusted, and then, the temperature of the substrate B is adjusted by the temperature control unit 22. Next, as illustrated in FIG. 2(b), the solid electrolyte membrane 13 is disposed on the surface of the positive electrode 11 made of a porous body, and then, the solid electrolyte membrane 13 is made into contact with the substrate B, and also, the conducting portion 12 is electrically connected to the substrate B. Specifically, the conducting portion 12 is disposed such that it surrounds the film-formation region E of the substrate B on which a metal film F is to be formed during formation of a film.

Next, the positive electrode 11 is moved toward the substrate B using the pressure unit 16, whereby the solid electrolyte membrane 13 is pressed against the film-formation region E of the substrate B. Accordingly, since the solid electrolyte membrane 13 can be pressed via the positive electrode 11, the solid electrolyte membrane 13 can be made to uniformly contact the surface of the film-formation region E of the substrate B. That is, a metal film F with a more uniform thickness can be formed while the solid electrolyte membrane 13 is allowed to be in contact with pressed against) the substrate using the positive electrode 11 as a backup material.

Next, a voltage is applied across the positive electrode 11 and the substrate B to serve as a negative electrode using the power supply unit 14, so that metal is deposited on the surface of the substrate B from metal ions contained in the solid electrolyte membrane 13. At this time, the metal film F is formed while the metal ion solution L is supplied to the positive electrode 11.

Consequently, using the positive electrode 11 made of a porous body allows the metal ion solution L to infiltrate into the positive electrode 11, and thus supply the solution L together with the metal ions to the solid electrolyte membrane 13. Accordingly, the metal ion solution L can be supplied via the positive electrode 11, which is a porous body, as needed during formation of a film. The supplied metal ion solution L passes through the positive electrode 11 and contacts the solid electrolyte membrane 13 that is adjacent to the positive electrode 11, so that the solid electrolyte membrane 13 is impregnated with the metal ions.

Then, a voltage is applied across the positive electrode 11 and the substrate B to serve as a negative electrode, whereby regarding the metal ions supplied from the positive electrode side, metal ions contained in the solid electrolyte membrane 13 move toward the conducting portion 12 side (i.e., the substrate B side) from the positive electrode 11 side, and thus, metal is deposited on the conducting portion side from the metal ions contained in the solid electrolyte membrane 13, Accordingly, the metal film F can be formed on the surface of the substrate B.

As described above, since the metal ion solution L can be supplied via the positive electrode 11, which is a porous body, as needed, it is possible to form metal films F with a desired thickness on the surfaces of a plurality of substrates B without restrictions on the amount of metal that can be deposited.

Further, since the conducting portion 12 is made into contact with the substrate B such that it surrounds the film formation region E, a uniform amount of current can be made to flow through the film formation region E, and thus, a metal film F with a uniform thickness and a desired shape and can be formed.

Further, it is possible to continuously form films on the surfaces of a plurality of substrates by conveying the substrate B having a film formed thereon with the use of the conveying device 40, replacing the substrate B with a substrate without a film formed thereon, and repeating the aforementioned operations.

[Second Embodiment]

Figure 3:
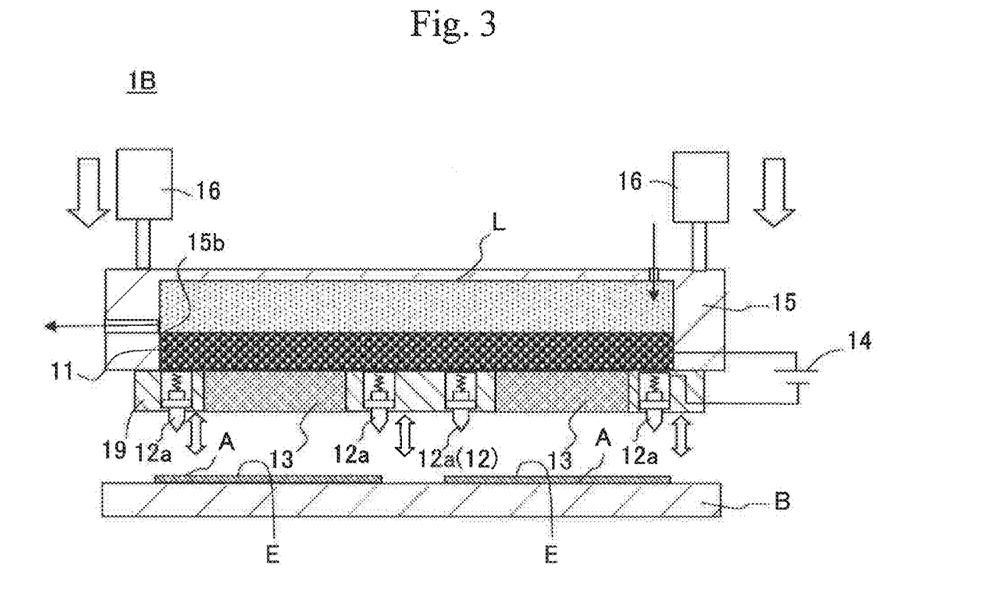
FIG. 3 is a schematic cross-sectional view of a film formation device for forming a metal film in accordance with a second embodiment of the present invention.
Figure 4:
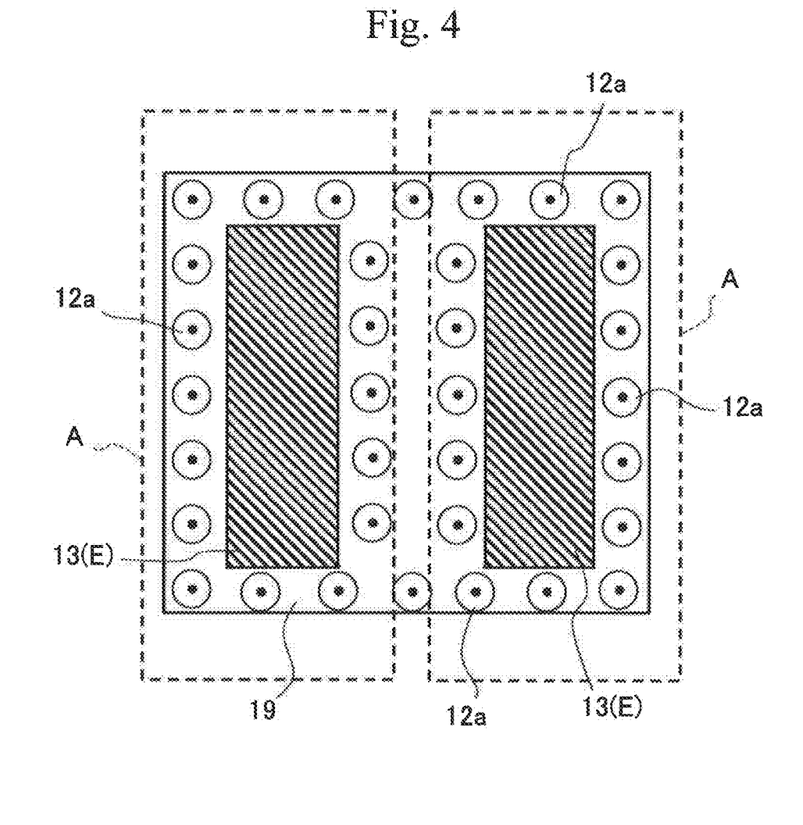
FIG. 4 is a schematic plan view of a bottom face of the film formation device shown in FIG. 3.
Figure 5:
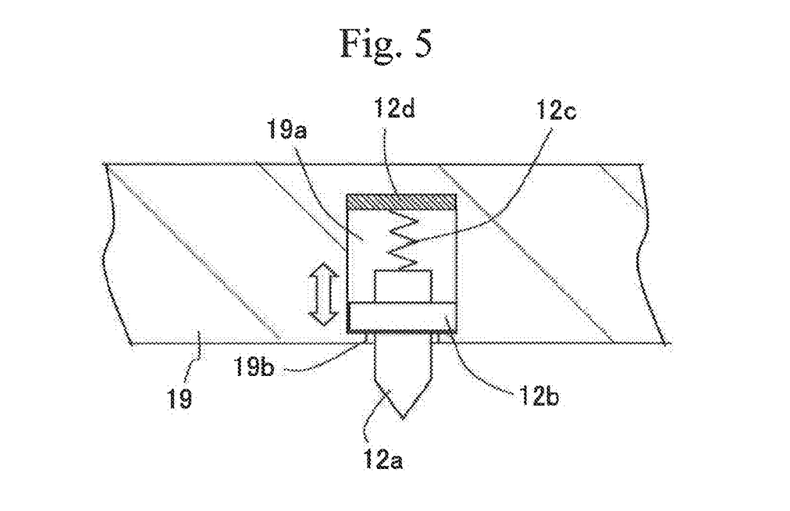
FIG. 5 is a cross-sectional view illustrating the structure of a conducting portion (conducting protrusions) of the film formation device shown in FIG. 3.
Figure 6:
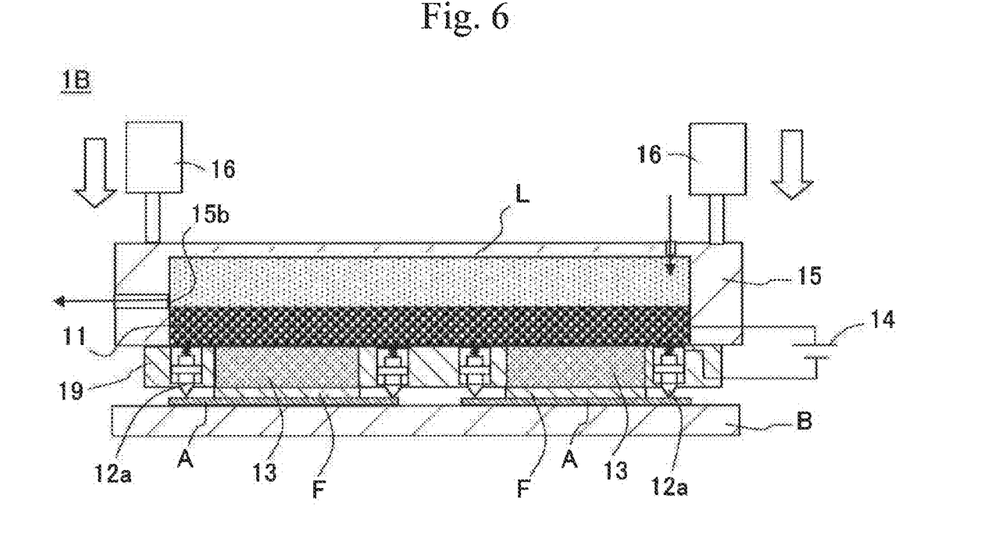
FIG. 6 is a schematic cross-sectional view illustrating the state of the film formation device shown in FIG. 3 during formation of a film.

FIG. 3 is a schematic cross-sectional view of a film formation device for forming a metal film in accordance with a second embodiment of the present invention. FIG. 4 is a schematic plan view of a bottom face of the film formation device shown in FIG. 3. FIG. 5 is a cross-sectional view illustrating the structure of a conducting portion (i.e., conducting protrusions) of the film formation device shown in FIG. 3. FIG. 6 is a schematic cross-sectional view illustrating the state of the film formation device shown in FIG. 3 during formation of a film.

The second embodiment differs from the first embodiment in the structure of the conducting portion of the film formation device and in that an insulating member is newly provided. Accordingly, structures that are common to those in the first embodiment are denoted by the same reference numerals, and detailed description thereof will be omitted.

As illustrated in FIG. 3, a film formation device 1B in accordance with the second embodiment includes at least a positive electrode 11 made of a metal porous body, a conducting portion 12 made of metal, a solid electrolyte membrane 13 disposed on the surface of the positive electrode 11, and a power supply unit 14 that applies a voltage across the positive electrode 11 and the conducting portion 12.

An opening is formed above the metal ion supply unit 15, and a pair of pressure units 16,16 that are similar to the pressure unit in the first embodiment are connected thereto. The pressure units 16 are adapted to press the solid electrolyte membrane 13 against a film formation region E of a substrate B by moving the positive electrode 11 toward the substrate B to serve as a negative electrode. Though not shown, in this embodiment, a solution tank having a metal ion solution L stored therein and a waste liquid tank for collecting a waste liquid are also connected to the metal ion supply unit 15 as in the first embodiment.

Further, as illustrated in FIG. 4, the solid electrolyte membrane 13 has a shape that conforms to the shape of the film formation region E of the substrate B, between the positive electrode 11 and the conducting portion 12. Further, the positive electrode 11 has an insulator 19 that is disposed thereon such that it surrounds the solid electrolyte membrane 13. The insulator 19 may he made of any material that can electrically insulate current from the power supply unit 14, for example, ceramics or polymer resin.

Furthermore, the conducting portion 12 has a plurality of conducting protrusions 12a, 12a . . . that are arranged such that they protrude toward the substrate B from the surface of the insulator 19. The plurality of conducting protrusions 12a, 12a . . . are arranged such that they surround the film formation region E of the substrate on which a metal film F is to be formed during formation of a film.

As illustrated in FIG. 5, each conducting protrusion 12a has a structure in which, when the conducting protrusion 12a is made into contact with the substrate B upon application of pressure by the pressure units 16, the conducting protrusion 12a is pressed into the insulator 19 due to the pressure applied. Specifically, the insulator 19 has formed therein a storage space 19a for storing the conducting protrusion 12a, and also has a hole portion 19b that allows the conducting protrusion 12a to protrude from the surface of the insulator 19.

A stopper 12b, which is larger than the inner diameter of the hole portion 19b, is provided at the center of the conducting protrusion 12a in the axial direction thereof. On the base end side of the conducting protrusion 12a, a bias member (e.g., a spring) 12c for biasing the conducting protrusion 12a toward the tip end side is disposed. Further, the bias member 12c is provided with a conducting member 12d made of metal to electrically connect each of the conducting protrusions 12a,12a, . . . .

According to such a configuration, it is possible to allow, when the conducting protrusions 12a are made into contact with the substrate B upon application of pressure by the pressure units 16, all of the conducting protrusions 12a to be pressed into the storage spaces 19a of the insulator 19. Meanwhile, when the applied pressure is released, the biasing member 12c causes each conducting protrusion 12a to move toward the tip end side, whereby the stopper 12b engages the hole portion 19b.

In addition, when each conducting member 12d is provided and the power supply unit 14 is connected to one of the conducting members 12d, it becomes possible to apply a voltage of the power supply unit 14 to the positive electrode 11 and all of the conducting protrusions 12a, 12a, . . . .

Hereinafter, a film formation method in accordance with this embodiment will be described. In this embodiment, a substrate, which is obtained by forming a metal base layer (i.e., a seed layer) A on the surface of a substrate B by sputtering, is used. in this embodiment, the metal base layer A formed on the substrate B corresponds to the negative electrode as referred to in the present invention.

First, as illustrated in FIG. 6, the solid electrolyte membrane 13 is disposed on the surface of the positive electrode 11 made of a porous body, and then, the solid electrolyte membrane 13 is made into contact with the substrate B, and also, all of the conducting protrusions 12a, 12a, . . . are electrically connected to (the metal base layer A of) the substrate B. Specifically, all of the conducting protrusions 12a,12a, . . . are disposed such that they surround the film formation region E of the substrate B on which the metal film F is to be formed during formation of a film.

Next, the positive electrode 11 is moved toward the substrate B using the pressure portions 16, whereby the solid electrolyte membrane 13 is pressed against the film formation region E of the substrate B (i.e., the metal base layer A). Accordingly, since the solid electrolyte membrane 13 can be pressed via the positive electrode 11, the solid electrolyte membrane 13 can be made to uniformly contact the surface of the film formation region E of the substrate B. Herein, when the conducting protrusions 12a are made into contact with the seed layer A on the substrate B upon application of pressure by the pressure unit 16, all of the conducting protrusions 12a can be pressed into the storage spaces 19a of the insulator 19 due to the pressure applied, with the contact state maintained.

Next, a voltage is applied across the positive electrode 11 and all of the conducting protrusions 12a, 12, . . . using the power supply unit 14, so that metal is deposited on the surface of the substrate (i.e. the surface of the metal base layer A) from metal ions contained in the solid electrolyte membrane 13. At this time, the metal film F is formed while the metal ion solution L is supplied to the positive electrode 11.

Consequently, advantageous effects that are similar to those in the first embodiment can be expected to be obtained, and also, the following further advantageous effects can be expected to be obtained. That is, since a film with a shape that conforms to the shape of the film formation region of the substrate B is used for the solid electrolyte membrane 13, and the insulator 19 is disposed on the positive electrode such that it surrounds the solid electrolyte membrane 13, it follows that the insulator 19 is disposed at a position not corresponding to the film formation region of the substrate B. Consequently, the metal film F is not formed on a portion of the surface of the substrate (i.e., the surface of the metal base layer A) that is opposite the insulator 19, and the metal film F with a desired shape can be formed on the film formation region E. Accordingly, patterning accuracy for the metal film F can be increased.

Further, since the conducting protrusions 12a, 12a, . . . , which are disposed such that they protrude toward the substrate from the surface of the insulator, are used as the conducting portion 12, it is possible to mechanically integrate the positive electrode 11 with the conducting portion 12. Accordingly, the conducting portion need not be disposed on the substrate side during formation of a film unlike in the first embodiment.

Further, since the conducting protrusions 12a, 12a . . . are made into contact with the surface of the substrate B such that they surround the film formation region E, a uniform amount of current to can be made to flow through the film formation region E, and thus, a metal film F with a uniform thickness and a desired shape can be formed.

Further, the conducting protrusions 12a, 12a . . . are, upon application of pressure by the pressure units 16, pressed into the storage spaces 19a of the insulator 19 while being in contact with the substrate B. Accordingly, since a state in which the tip end of each conducting protrusion 12a is in contact with the surface of the substrate is maintained, it is possible to ensure electrical connection between each conducting protrusion 12a and the substrate B. Further, the solid electrolyte membrane 13 can be made to uniformly contact the film formation region E of the substrate B. Consequently, a metal film F with a uniform thickness can be formed more easily.

[Third Embodiment]

Figure 7:
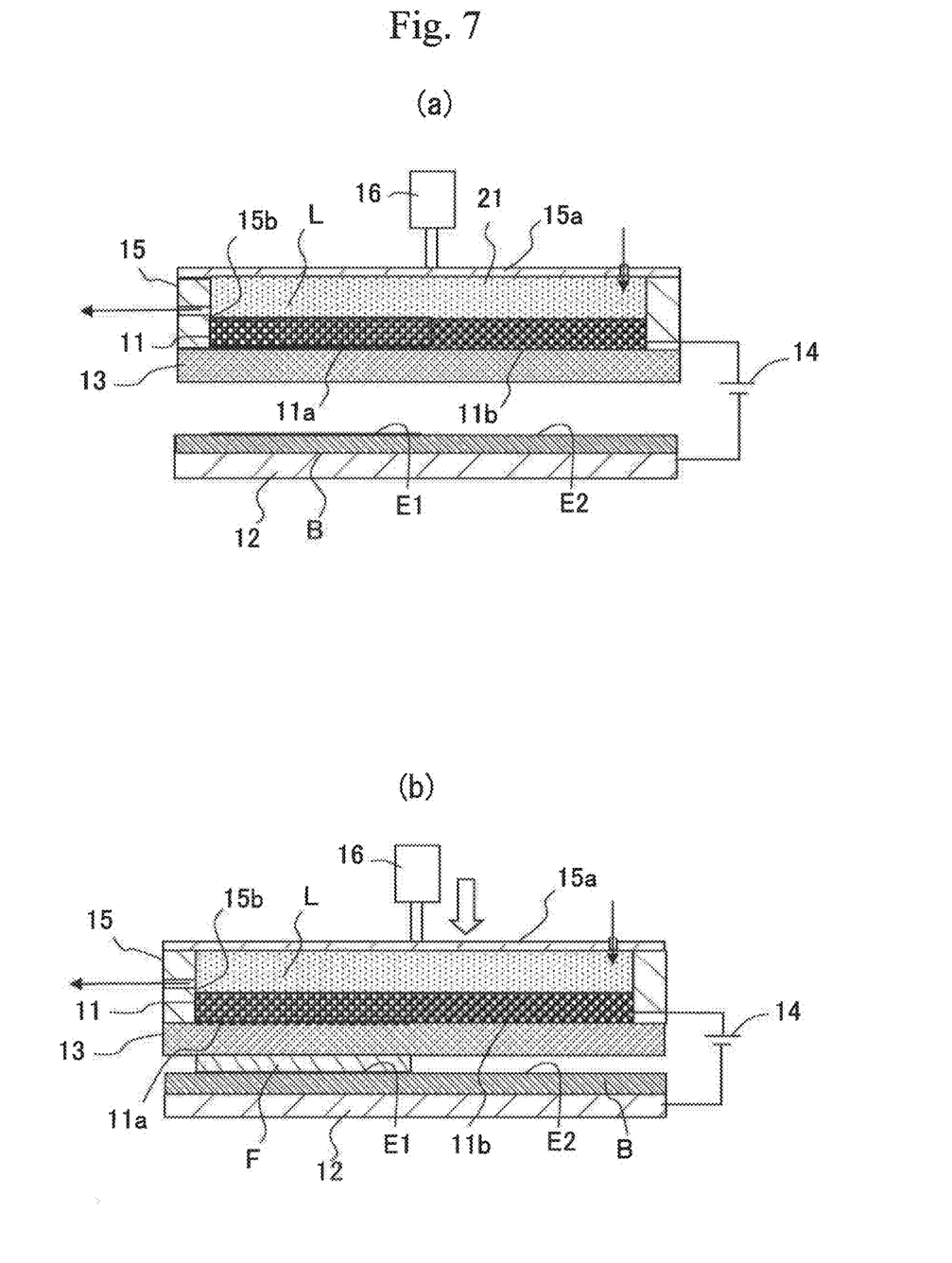
FIG. 7 are views illustrating a film formation method that uses the film formation device for forming a metal film in accordance with a third embodiment of the present invention; specifically.

FIGS. 7 are views illustrating a film formation method that uses the film formation device for forming a metal film in accordance with a third embodiment of the present invention; specifically, FIG. 7(a) is a schematic cross-sectional view illustrating the state of the film formation device before formation of a film, and FIG. 7(b) is a schematic cross-sectional view illustrating the state of the film formation device during formation of a film.

The third embodiment differs from the first embodiment in the structures of the conducting portion and the positive electrode of the film formation device. Accordingly, structures that are common to those in the first embodiment are denoted by the same reference numerals, and detailed description thereof will be omitted.

In this embodiment, as illustrated in FIGS. 7(a) and 7(b), a conducting portion 12 is arranged at a position opposite a positive electrode 11, and a substrate B is disposed on the conducting portion 12. At least the surface of the positive electrode that is contact with a solid electrolyte membrane 13 has a film formation surface 11a, which has a shape that conforms to the shape of a film formation region E1 of the substrate B, and a non-film formation surface 11b other than the film formation surface 11a. Metal of the film formation surface 11a is metal with a lower oxygen overvoltage than that of metal of the non-film formation surface 11b.

For example, when the aforementioned foamed titanium is used for the positive electrode, there may be cases where $TiO_2$ is formed as a passivation film on the surface of the foamed titanium. In such a case, metal of the non-film formation surface 11b is formed with $TiO_2$, and the film formation surface 11a is further covered with a metal film of Pt, $RuO_2$, or the like.

Herein, the oxygen overvoltage of Pt is 0.3 V. and the oxygen overvoltage of $RuO_2$ is 0.2 V. The oxygen overvoltage of $TiO$ is 3.3 V. That is, metal such as Pt or $RuO_2$ that forms the film formation surface 11 is metal with lower oxygen overvoltage than that of $TiO_2$ on the surface of the non-film formation surface 11b. It should be noted that the oxygen overvoltage herein is a voltage measured when a current of 1 mA/cm² is added in the current process.

It should also be noted that the metal film of Pt, $RuO_2$, or the like can be formed on the surface of the porous body (i.e., the positive electrode 11) by electrolytic Plating, PVD such as sputtering, or CVD using plasma such that the metal film does not block holes of the porous body.

As described above, since the metal of the film formation surface 11a is metal with a lower oxygen overvoltage than that of metal of the non-film. formation surface 11b, it is possible to increase the deposition reactivity of metal on the film formation region E1 of the substrate B, which is opposite the film formation surface 11a, from metal ions during formation of a film. That is, in this embodiment, a voltage applied to deposit metal on the film formation region E1 of the substrate B can be lower than that when the positive electrode in the first embodiment is used.

Consequently, as illustrated in FIG. 7(b), metal can be deposited only on the film formation region E1 of the substrate 11 that is opposite the film formation surface 11a, As described above, a metal film F can be formed with a pattern corresponding to the film formation surface 11a without the need to mask the non-film formation region E2 of the substrate 12 or the like.

It should be noted that when foamed titanium is used for the positive electrode in the first embodiment, $TiO_2$ is formed as a passivation film on the surface of the positive electrode, However, even in such a state, the metal film F can be obviously formed by adjusting the voltage applied by the power supply unit 14 (specifically, by adjusting the voltage applied to be higher than the voltage applied during formation of a film in the third embodiment).

[Fourth Embodiment]

Figure 8:
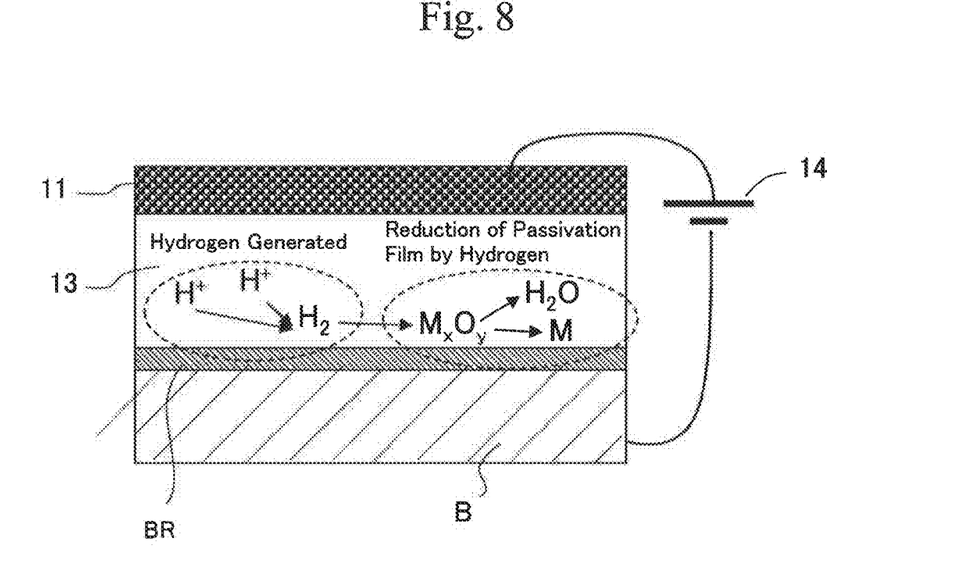
FIG. 8 is a schematic cross-sectional view illustrating a pretreatment step of a film formation device for forming a metal film in accordance with a fourth embodiment of the present invention.

FIG. 8 is a schematic cross-sectional view illustrating a pretreatment step of a film formation device for forming a metal film in accordance with a fourth embodiment of the present invention, The fourth embodiment differs from the first embodiment in that an acid aqueous solution (i.e., an electrolytic solution) is stored as a solution stored in the metal ion supply unit instead of the metal ion solution. L. Accordingly, structures that are common to those in the first embodiment are denoted by the same reference numerals, and detailed description thereof will be omitted.

As a substrate B shown in FIG. 8, a substrate made of aluminum, an aluminum alloy, or the like, or a substrate having an oxide film BR formed thereon is used, for example. It should be noted that when a substrate made of aluminum, an aluminum alloy, or the like is used, an oxide film BR is formed as a passivation film on the surface of the substrate.

As described above, when an oxide film BR is formed on the surface of the substrate B, a metal film F, which is formed on the oxide film BR, may not retain sufficient adhesion strength with respect to the substrate B. In such a case, as illustrated in. FIG. 8, the solid electrolyte membrane 13 is impregnated with hydrogen ions, and a voltage is applied by the power supply unit 14 across the positive electrode 11 and the substrate to serve as a negative electrode, so that an oxide MxOy of the oxide film BR is reduced to metal M by the hydrogen ions (i.e., a hydrogen reduction treatment). At this time, the oxide MxOy on the surface of the oxide film may be reduced to metal M if the adhesion strength of the metal film F can be retained.

Consequently, the oxide MxOy on the surface of the Substrate B can be removed (reduced) before the metal film F is formed. The metal film F that is formed on the reduced surface has higher adhesion to the substrate B as compared to a metal film that is formed on a surface having an oxide film BR formed thereon. It should be noted that the voltage applied by the power supply unit 14 is greater than or equal to the theoretical voltage (1.23 V) at which hydrogen gas is generated.

Impregnation of the solid electrolyte membrane 13 with hydrogen ions can be accomplished by storing an acid aqueous solution (i.e., an acid solution) as a solution stored in the metal ion supply unit instead of the metal ion solution L. That is, an acid aqueous solution stored in the metal ion supply unit can infiltrate into the positive electrode 11 made of a porous body, and then infiltrate into the solid electrolyte membrane 13 from the positive electrode 11, thereby impregnating the inside of the solid electrolyte membrane 13.

For such an acid aqueous solution, a solution of pH4 or less is used, such as an aqueous solution of sulfuric acid, nitric acid, or hydrochloric acid. Although an acid aqueous solution is used in this embodiment, the solution containing metal ions may be an acid solution. In such a case, it is possible to, when forming a film, form a metal film through reduction of metal ions and reduce an oxide of the oxide film through hydrogen reduction at the same time.

EXAMPLES

The present invention will be described by way of the following examples.

Example 1

A metal film was formed using the aforementioned device illustrated in FIG. 7, As a substrate, on the surface of which a film is to be formed, a pure aluminum substrate (50 mm×50 mm×thickness of 1 mm) was prepared, and a Ni-plated film was formed on the surface thereof, and further, an Au-plated film was formed on the surface of the nickel film. Next, a positive electrode obtained by plating a film formation surface, which corresponds to a film formation region, of the surface of a porous body made of foamed titanium of 10 mm×10 mm 1 mm (a product of Mitsubishi Materials Corporation), with platinum was used.

An electrolyte membrane with a thickness of 183 μm (a product of DuPont: Nafion N117) was used for the solid electrolyte membrane. The film was formed with a 1 mol/L copper sulfate solution prepared as the metal ion solution, a current density of 2.5 mA/cm², a processing time of 30 minutes, and a pressure of 0.1 MPa applied from above the positive electrode.

(Result 1)

Figure 9:
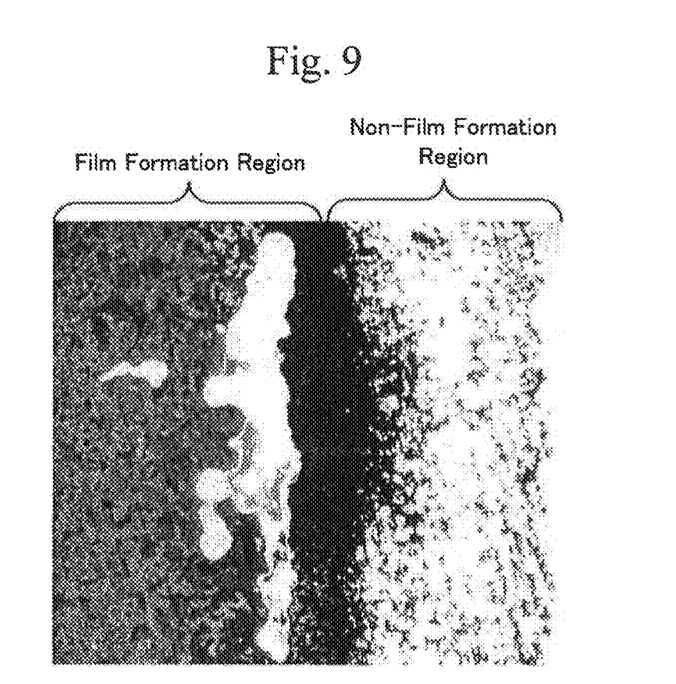
FIG. 9 is a photograph of the surface of a substrate in accordance with an example on which a film is formed using the film formation device for forming a metal film in accordance with the third embodiment of the present invention.

As illustrated in FIG. 9, a copper film, which conforms to the shape of the film formation surface of the positive electrode, was formed on the film formation region that is opposite the film formation surface, while a copper film was not formed on the non-film formation region that is opposite the non-film formation surface (see FIG. 9).

Example 2

A metal film was formed using the device illustrated in FIG. 9. As a substrate on which a film is to be formed, a pure aluminum substrate was prepared as in Example 1, and a 0.1 mol/L sulfuric acid aqueous solution was supplied as an electrolytic solution (i.e., an acid aqueous solution). Next, hydrogen reduction treatment for the aluminum substrate was performed for 5 minutes with a voltage of 2.0 V applied across the positive electrode and the negative electrode (i.e., the substrate). Next, a metal film was formed on the surface of the aluminum substrate that has been subjected to the hydrogen reduction treatment. The film was formed with a 1 mol/L copper sulfate solution prepared as a metal ion solution, a current density of 5 mA/cm², a processing time of 10 minutes, and a pressure of 0.1 MPa applied from above the positive electrode.

Example 3

As in Example 2, a metal film was formed after hydrogen reduction treatment for a substrate was performed. Example 3 differs from Example 2 in that an oxygen-free copper plate was used for the substrate, and oxidation treatment was performed to form an oxide film with a thickness of about 120 nm.

Example 4

As in Example 2, a metal film was formed after the hydrogen reduction treatment for a substrate in accordance with Example 1 was performed. Example 4 differs from Example 2 in that Ni—P plating was performed on the pure aluminum substrate, and then, oxidation treatment was performed by performing thermo-hygrostat treatment at a temperature of 40° C. and a humidity of 90%.

Comparative Examples 1-3

In Comparative Example 1, a metal film was formed as in Example 2. In Comparative Example 2, a metal film was formed as in Example 3. In Comparative Example 3, a metal film was formed as in Example 4. Comparative Examples 1 to 3 differ from corresponding Examples 2 to 4 in that hydrogen reduction treatment for the substrate is not performed as pre-treatment of the film formation.

(Result 2)

In Examples 2 to 4, a copper film was formed through deposition (electrodeposition) of copper. In Comparative Examples 1 to 3, a copper film was also formed through deposition (electrodeposition) of copper, but the adhesion thereof was not sufficient. This is considered to he due to the fact that since an oxide on the surface of the substrate was reduced in Examples 2 to 4, it was possible to form a metal film with higher adhesion on the reduced surface.

Although the embodiments of the present invention have been described in detail above, the present invention is not limited thereto, and various variations are possible insofar as they fall within the spirit and scope of the present invention.

REFERENCE SIGNS LIST 1A, 1B Film formation device
11 Positive electrode
11a Film formation surface
11b Non-film formation surface
12 Conducting portion
12a Conducting protrusion
12b Stopper
12c Biasing member
12d Conducting member
13 Solid electrolyte membrane
14 Power supply unit
15 Metal ion supply unit
15a Lid portion
15b Inner wall
16 Pressure unit
17 Solution tank
17a Supply pipe
18 Waste liquid tank
18a Waste liquid pipe
19 Insulator
19a Storage space
19b Hole portion
21 Base
22 Temperature control unit
40 Conveying device
A Seed layer
B Substrate (negative electrode)
E Film formation region
F Metal film
L Metal ion solution

The invention claimed is:

1. A film formation device for forming a metal film, comprising at least:
   a positive electrode;
   a solid electrolyte membrane formed on a surface of the positive electrode, the solid electrolyte membrane being disposed between the positive electrode and a substrate to serve as a negative electrode; and
   a power supply unit adapted to apply a voltage across the positive electrode and the substrate, wherein
   a voltage is applied across the positive electrode and the substrate to deposit metal on a surface of the substrate from metal ions contained in the solid electrolyte membrane, so that a metal film made of the metal is formed,
   the positive electrode is made of a porous body that allows a solution containing the metal ions to pass therethrough and supplies the metal ions to the solid electrolyte membrane,
   the film formation device further comprises a pressure unit adapted to move the positive electrode toward the substrate, thereby pressing the solid electrolyte membrane against the substrate on which a film is to be formed,
   the film formation device further comprises a conducting portion that is formed in a manner surrounding a film formation region of the substrate during formation of the film, the conducting portion being adapted to electrically connect a negative electrode of the power supply unit and the substrate, the solid electrolyte membrane has a shape that conforms to a shape of the film formation region of the substrate, an insulator is further disposed on the positive electrode in a manner surrounding the solid electrolyte membrane, and the conducting portion includes a plurality of conducting protrusions that are disposed on the insulator in a manner protruding toward the substrate from a surface of the insulator.

2. The film formation device for forming a metal film according to claim 1, wherein the conducting protrusions have a structure in which, when the conducting protrusions are made into contact with the substrate upon application of pressure by the pressure unit, the conducting protrusions are pressed into the insulator due to the pressure applied.

3. A film formation device for forming a metal film, comprising at least:
 a positive electrode;
 a solid electrolyte membrane formed on a surface of the positive electrode, the solid electrolyte membrane being disposed between the positive electrode and a substrate to serve as a negative electrode; and
 a power supply unit adapted to apply a voltage across the positive electrode and the substrate, wherein
 a voltage is applied across the positive electrode and the substrate to deposit metal on a surface of the substrate from metal ions contained in the solid electrolyte membrane, so that a metal film made of the metal is formed,
 the positive electrode is made of a porous body that allows a solution containing the metal ions to pass therethrough and supplies the metal ions to the solid electrolyte membrane,
 a surface of the positive electrode that is in contact with the solid electrolyte membrane has a film formation surface with a shape that conforms to a shape of a film formation region of the substrate, and a non-film formation surface other than the film formation surface, and
 metal of the film formation surface is metal with a lower oxygen overvoltage than that of metal of the non-film formation surface.

4. A film formation device for forming a metal film, comprising at least:
 a positive electrode;
 a solid electrolyte membrane formed on a surface of the positive electrode, the solid electrolyte membrane being disposed between the positive electrode and a substrate to serve as a negative electrode; and
 a power supply unit adapted to apply a voltage across the positive electrode and the substrate, wherein
 a voltage is applied across the positive electrode and the substrate to deposit metal on a surface of the substrate from metal ions contained in the solid electrolyte membrane, so that a metal film made of the metal is formed,
 the positive electrode is made of a porous body that allows a solution containing the metal ions to pass therethrough and supplies the metal ions to the solid electrolyte membrane, and
 the solid electrolyte membrane contains hydrogen ions.

5. The film formation device for forming a metal film according to claim 1, further comprising a metal ion supply unit for supplying a solution containing the metal ions to the positive electrode.

6. The film formation device for forming a metal film according to claim 3, further comprising a metal ion supply unit for supplying a solution containing the metal ions to the positive electrode.

7. The film formation device for forming a metal film according to claim 4, further comprising a metal ion supply unit for supplying a solution containing the metal ions to the positive electrode.

8. The film formation device for forming a metal film according to claim 3, further comprising a pressure unit adapted to move the positive electrode toward the substrate, thereby pressing the solid electrolyte membrane against the substrate on which a film is to be formed.

9. The film formation device for forming a metal film according to claim 4, further comprising a pressure unit adapted to move the positive electrode toward the substrate, thereby pressing the solid electrolyte membrane against the substrate on which a film is to be formed.

* * * * *